(12) United States Patent
Peh

(10) Patent No.: US 6,397,318 B1
(45) Date of Patent: May 28, 2002

(54) ADDRESS GENERATOR FOR A CIRCULAR BUFFER

(75) Inventor: Kheng Boon Peh, Singapore (SG)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/053,856

(22) Filed: Apr. 2, 1998

(51) Int. Cl.⁷ .............................................. G06F 12/00
(52) U.S. Cl. ...................................... 711/220; 711/217
(58) Field of Search ............................... 711/1, 110, 211, 711/217, 219, 220; 365/230.02, 230.08, 73, 77

(56) References Cited

U.S. PATENT DOCUMENTS

| | | | |
|---|---|---|---|
| 4,169,289 A | 9/1979 | Shively | 710/56 |
| 4,742,479 A | 5/1988 | Kloker et al. | 708/491 |
| 5,623,621 A | 4/1997 | Garde | 711/220 |
| 5,649,146 A * | 7/1997 | Riou | 711/217 |
| 5,659,698 A | 8/1997 | Weng et al. | 711/220 |
| 5,659,700 A | 8/1997 | Chen et al. | 711/217 |
| 5,765,218 A * | 6/1998 | Ozawa et al. | 711/219 |
| 5,983,333 A * | 11/1999 | Kolagotla et al. | 711/219 |

* cited by examiner

*Primary Examiner*—Do Hyun Yoo
*Assistant Examiner*—Gary J. Portka
(74) *Attorney, Agent, or Firm*—George O. Saile & Assoc.

(57) ABSTRACT

This invention describes an apparatus and method for the fast and efficient generation of addresses for a circular buffer involving only addition. The invention uses as input the present address, the base address, the length of the circular buffer and the address offset to the next address. The address offset can be either a positive or negative value, and the polarity of the offset is used to control different operations within the apparatus. The apparatus is constructed of two adders, a comparator and a multiplexer, and the next address is selected from the output of either of the two adders based on the output of the comparator.

9 Claims, 4 Drawing Sheets

| M | a' ≥ b' | Cond. | A(new) |
|---|---|---|---|
| + | 1 | 1 | b=A+M−L |
| + | 0 | 0 | a=A+M |

ADDRESS GENERATOR FOR A CIRCULAR BUFFER

BACKGROUND OF THE INVENTION

1. Field of Invention

This invention relates to address generation and in particular a high speed hardware address generation for a circular buffer.

2. Description of Related Art

Addresses for circular buffers can be modified by a positive or negative offset to determine the next address. The buffer has a finite length and when the upper or lower bound is reached the next address may need to be wrapped such as to start from the opposite boundary. This makes the buffer to appear to be circular.

In U.S. Pat. No. 5,623,621 (Garde) is a hardware circular buffer address generator utilizing an adder-subtractor and a second adder to adjust the next circular buffer address to be within a valid range. This address generator calculates both the absolute value and the wrapped value of the next address and selects one according to which one falls within the valid address range. The base address B is used for both the upper and lower bounds of the circular buffer, and it appears that the comparator requires equal to and less than, and equal to and greater than operations.

Referring to U.S. Pat. No. 5,659,698 (Weng et al.), a circular buffer address generator is described in which a potential next address is generated and compared with both the upper and lower boundaries of the circular buffer requiring two adders in the wrap-around generator. If the potential next address falls outside the valid range of the circular buffer, the beginning address and a wrap address is presented to a multiplexer for selection as the next address.

In U.S. Pat. No. 5,659,700 (Chen et al.) a method and apparatus is shown for generating an address for a circular buffer using a modulo address for accessing the buffer. This invention determines an absolute address and a wrapped address, and comparisons are made to determine which to use depending on the sign of the offset. Referring to U.S. Pat. No. 4,742,479, (Kloker) a modulo arithmetic unit is shown for providing a sum and difference of two numbers with each modulus having a lower and upper boundary with a range of intermediate values. In U.S. Pat. No. 4,169,289 (Shively) a circular buffer is shown as an apparatus for designating contiguous memory locations in a data memory. when a potential next address exceeds the upper buffer location, the buffer length is subtracted from the potential next address to produce an address within the buffer range.

SUMMARY OF THE INVENTION

This invention is a fast and efficient hardware implementation for address generator of a circular buffer. The hardware implementation involves two adders, a comparator and a multiplexer. One of the two adders is a three input adder in which the third input is masked to zero when only two inputs are needed. The operation of the address generating circuitry involves only addition, and there is no need at run time to determine any change in sign for any of the inputs to the circuitry.

The first of the two adders has three inputs to add together, the present address (A), an address offset (M) and the negative value of the length of the circular buffer (−L). The negative value of the length of the buffer is created by an exclusive NOR with the MSB (most significant bit) of the offset, and Is used to bring the potential new address back into range when a positive offset forces the potential new address beyond the upper bound of the circular buffer. When the offset is negative, the negative value of the buffer length is not needed and a mask of zero value Is used to inhibit the negative value of the buffer length from the three input adder. A residue of "1" is connected to the three input adder by using an Inverted output of MSB of the offset. When the offset is positive, MSB=0, and a residue of "1" is needed in conjunction with a negative value of the length of the circular buffer (−L).

The output of the three input adder is connected to an input of a two input adder, a multiplexer, and a comparator. The two input adder adds a positive value of the buffer length (L) to the sum of the three input adder. The output of the two input adder is connected to an input of the multiplexer. The multiplexer selects one of its two inputs as the next address for the circular buffer under the control of the comparator. The comparator compares the output of the three input adder to the base address (B) of the circular buffer. The results of the comparator is used to select which input to the multiplexer is the next address for the circular buffer, the output of the three input adder or the output of the two input adder.

The output opf the comparator (Cond.) selects the correct multiplexer input based on the comparison of the base address (B) and the output of the three input adder. When the offset is positive, the two input adder produces a sum which is A+M and the three input adder produces a sum A+M−L. When the offset is negative, the two input adder produces a sum which is A+M+L and the three input adder A+M. Thus each adder produces a summation of different elements depending on the polarity of the offset. If the offset is negative and the base address (B) Is greater than the output of the three input adder (A+M), then the output of the two way adder (A+M+L) is chosen. If the offset is negative and the base address (B) is less than the output of the three input adder, then the output of the three way adder (A+M) is chosen. If the offset is positive and the base address (B) is greater than the output of the three input adder (A+M−L), then the output of the two way adder (A+M) is chosen. If the offset Is positive and the base address (B) is less than the output of the three input adder, then the output of the three input adder (A+M−L) is chosen.

BRIEF DESCRIPTION OF THE DRAWINGS

This invention will be described with reference to the accompanying drawings, wherein.

DETAILED DESCRIPTION OF THE PREFERRED EMBODIMENT

Figures 1A, 1B:
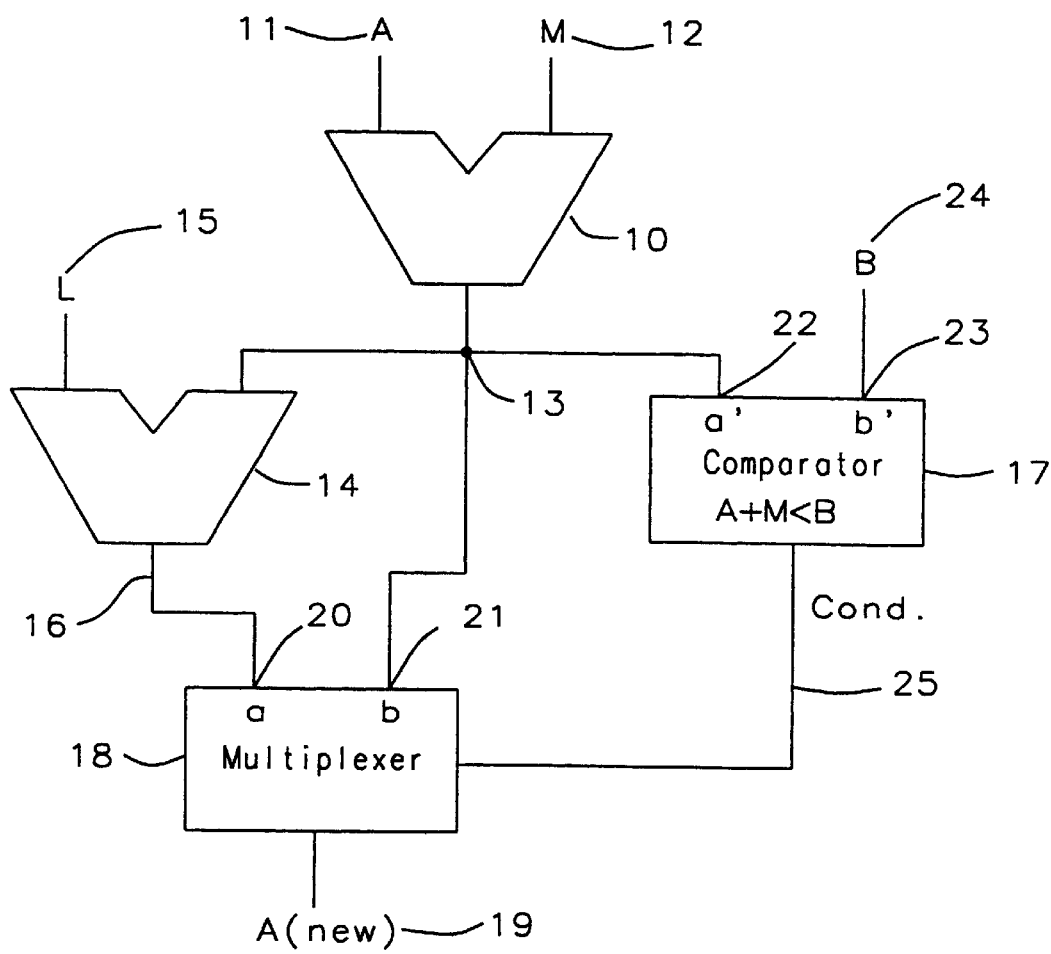
FIG. 1*a* is a schematic diagram of a circular buffer address generator for a negative address offset.
FIG. 1*b* is a table of conditions for choosing the next circular buffer address for a negative offset.

Referring to FIG. 1*a*, a circuit with two adders 10 14 is shown that determines the next address A(new) 19 of a circular buffer where the address offset (M) 12 is negative. A first adder 10 has as its input the present address (A) 11 and the address offset (M) 12 and producing an output (A+M) 13. The output of the first adder 10 is connected to an input of a second adder 14, an input of a multiplexer (b) 21, and an input (a') 22 of a comparator 17. The second adder 14 has as its second input the buffer length (L) 15 and produces an output (A+M+L) 16 which is connected an input (a) 20 of the multiplexer 18. The base address (B) 24 is connected to an input (b') 23 of the comparator 17. The comparator 17 determines if the output 13 of the first adder 10 is less than the base address (B) 24, A+M<B. If A+M<B, the next address needs to be wrapped to allow the next address to fall within the boundaries of the circular buffer. Wrapping the address is accomplished by adding the length of the buffer (L) 15 to the output of the first adder (A+M) 13. The output of the comparator 25 is a logical one (Cond.=1) when A+M<B and is connected to the multiplexer 18 to select input (a) 20 as the output 19, A(new)=A+M+L. If the inputs to the comparator 22 23 produce a comparison where A+M>B, the next address does not need to be wrapped and the output of the comparator 25 is a logical zero (Cond.=0) which selects input (b) 21 as the output 19, A(new)=A+M.

In FIG 1b is shows a table of the controlling factors in the address generator circuit of FIG. 1a. Shown in the column headed "M" is the polarity of the offset. In the column headed by (a'<b') is the value of the comparator inequality, where true=1, and the column headed "Cond." shows the value the output of the comparator circuit. The column headed "A(new)" shows the next address depending on the previous conditions. The polarity of the offset (M) is negative. When the comparator inputs satisfy the inequality a'<b' the output of the comparator is Cond.=1 which controls the multiplexer to chose A(new)=a=A+M+L where (a) is an input to the multiplexer 20. When the comparator inputs do not satisfy the inequality a'<b', the output of the comparator is Cond.=0 which controls the multiplexer to chose A(new)= b=A+M where (b) is an input to the multiplexer 21.

Figures 2A, 2B:
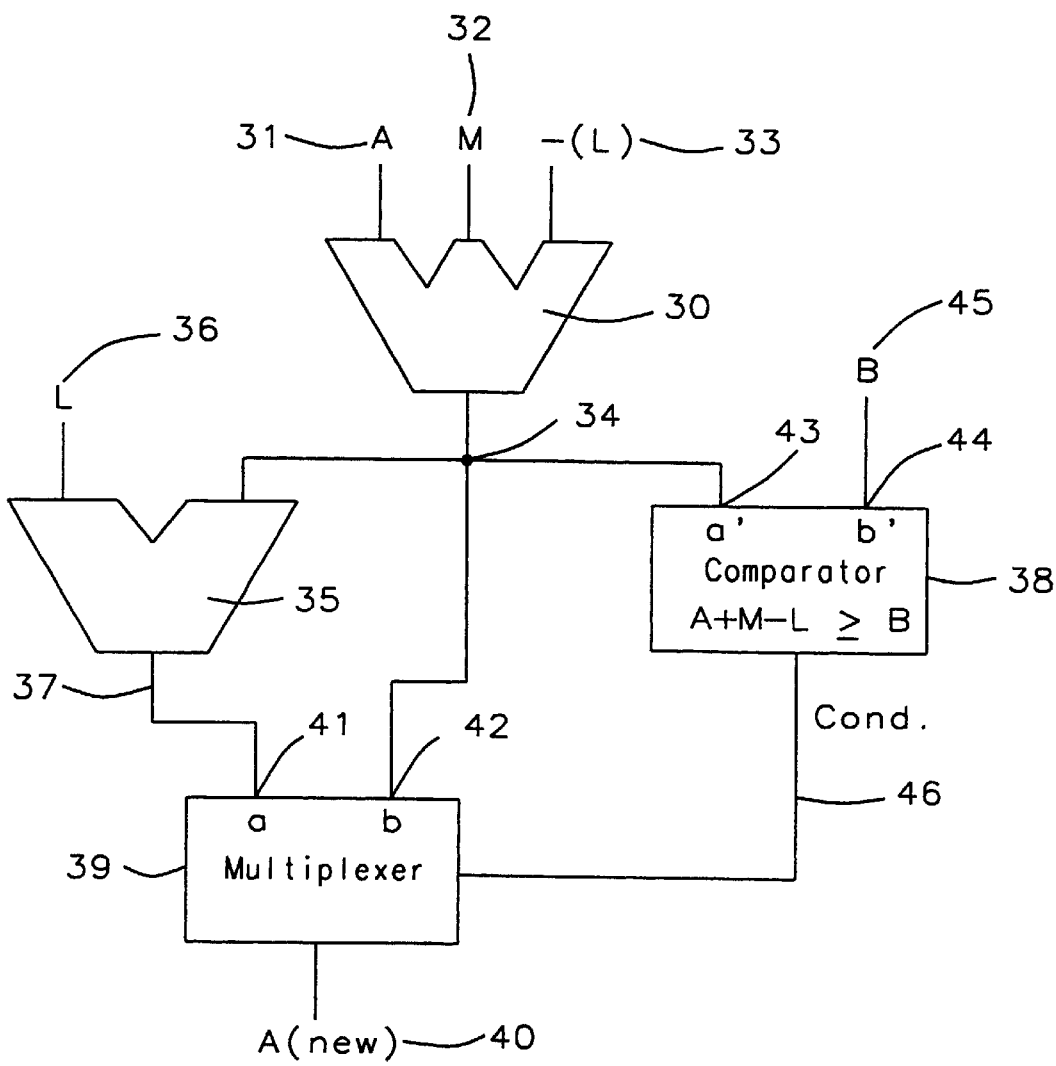
FIG. 2*a* is a schematic diagram of a circular buffer address generator for a positive address offset.
FIG. 2*b* is a table of conditions for choosing the next circular buffer address for a positive offset.

Referring FIG. 2a, a circuit with two adders 30 35 is shown that determines the next address A(new) 40 of a circular buffer where the address offset (M) 32 is positive. The first adder 30 has as its input the present address (A) 31, the address offset (M) 32 and the negative value of the length of the buffer (−L) 33. The output 34 of the first adder (A+M−L) 30 is connected to an input of a second adder 35, an input of a multiplexer (b) 42, and an input (a') 43 of a comparator 38. The second adder 35 has as its second input the buffer length (L) 36 and produces an output (A+M) 37 which is connected an input (a) 41 of the multiplexer 39. The base address (B) 45 is connected to an input (b') 44 of the comparator 38. The comparator 38 determines if the output 34 of the first adder 30 is greater or equal to the base address (B) 45, A+M−L≧B. If A+M−L≧B, the next address does need to be wrapped to allow the next address to fall within the boundaries of the circular buffer. In the circuit of FIG. 2a this is accomplished by choosing the output of the first adder 34 as the next address. The output of the comparator 46 is a logical one (Cond.=1) when A+M−L≧B and is connected to the multiplexer 39 to select input (b) 42 as the output 40, A(new)=A+M−L. If the inputs to the comparator 43 44 produce a comparison where A+M−L<B, the next address does not need to be wrapped and the output of the comparator 38 is a logical zero (Cond.=0) which selects input (a) 41 as the output 40, A(new)=A+M.

In FIG. 2b is shows a table of the controlling factors in the address generator circuit of FIG. 2a. These conditions are similar to those shown in FIG. 1b except the offset (M) is positive and the selection inequality for the multiplexer inputs is reversed (a'≧b'). When the comparator inputs satisfy the inequality a'≧b' the output of the comparator is Cond.=1 which controls the multiplexer to chose A(new)= b=A+M−L where (b) is an input to the multiplexer 42. When the comparator inputs do not satisfy the inequality a'≧b', the output of the comparator is Cond.=0 which controls the multiplexer to chose A(new)=a=A+M where (a) is an input to the multiplexer 41.

Figures 3A, 3B:
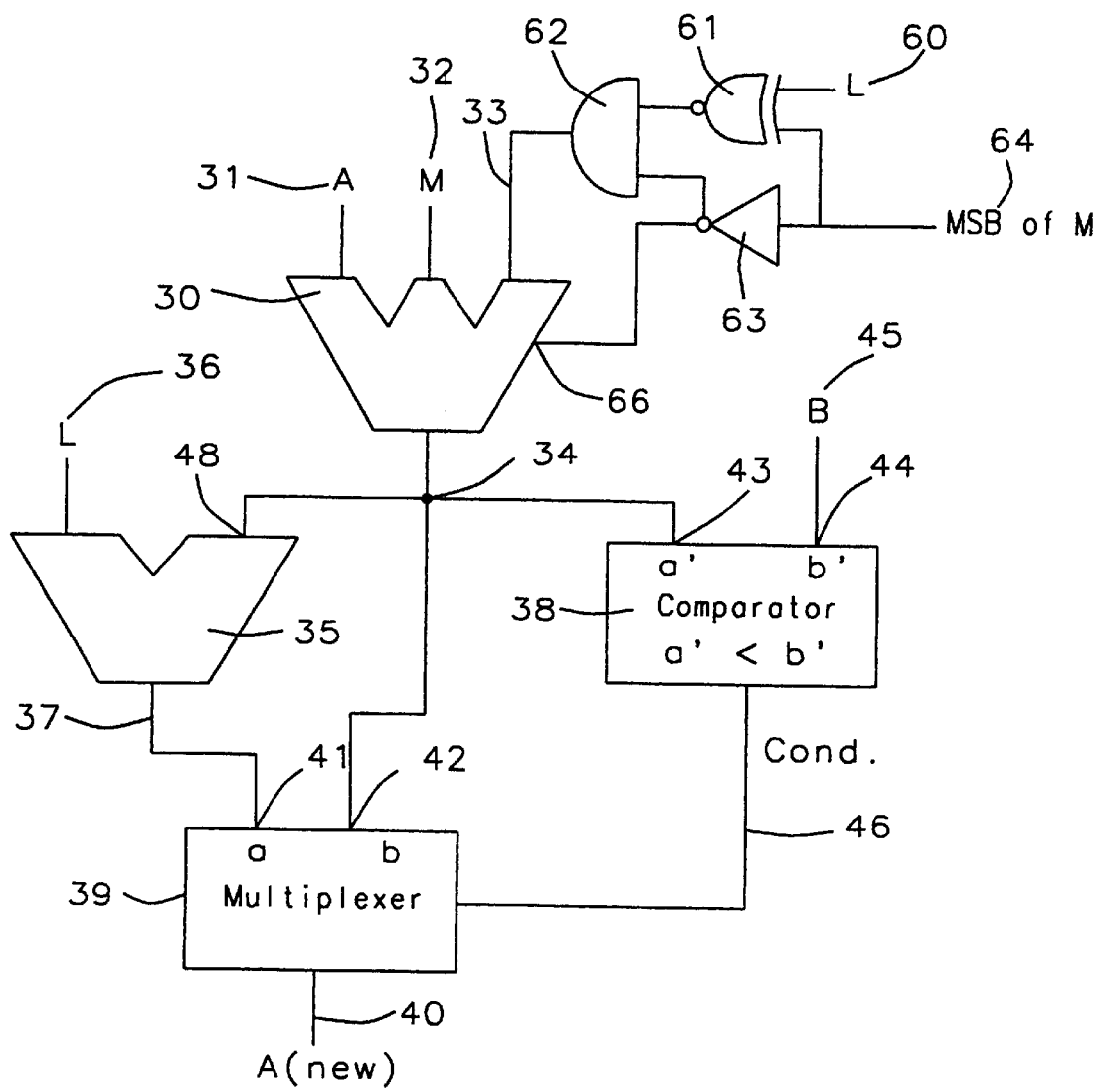
FIG. 3*a* is a schematic diagram of a circular buffer address generator combining positive and negative address offset effects and controls.
FIG. 3*b* is a table of conditions for choosing the next circular buffer address for either a positive or negative offset.

In FIG. 3a is shown a circuit that combines the circuits of FIG. 1a and FIG. 2a with the addition of some logic 61 62 63 to produce a negative value of the buffer length (L) 60, mask the input 33 to the three input adder 30 to which the buffer length 60 is connected, and provide a residue of "1" to an control input 66 to the three input adder 30 by means of the inverter 63 that inverts the MSB of the offset M 64. In addition the comparator 38 only compares a'<b' since a'≧b' used in the circuit of FIG. 2a and a'<b' used in the circuit of FIG. 1a can be made to yield the same results with some simple manipulations.

Continuing to refer to FIG. 3a, a circuit with two adders 30 35 is shown that determines the next address A(new) 40 of a circular buffer independent of whether the address offset (M) 32 is positive or negative. The first adder 30 has as its input the present address (A) 31, the address offset (M) 32 and the negative value of the length of the buffer 33. The negative value of the buffer length is created by an exclusive NOR 61 of the buffer length (L) 60 and the MSB of the offset (M) 64. The negative value of the buffer length is connected to an input 33 of the first adder 30 through an AND circuit 62. A second input to the AND circuit 62 is connected to the MSB of the offset (M) 64 through an inverter circuit 63. When the value of the offset (M) 32 is negative, MSB of M 64 is equal to one, and the "AND" circuit 62 is turned off, masking the output of the exclusive NOR 61 from the input 33 of the first adder. The mask provides a logical zero to the input 33 of the first adder 30 which effectively reduces the adder from three to two inputs, (A) 31 and (M) 32. When the value of the offset (M) 32 is positive, the MSB of M 64 is zero and a negative value of the length of the buffer 33 is connected to the first adder 30. A residue of "1" is must be connected to the adder to make the addition of the negative value of the length of the buffer 33 correct. This is accomplished by connecting the output of the inverter 63 to the control input 66 of the first adder 30. The output of the first adder 30 is A+M when the value of the offset (M) 32 is negative and A+M−L when the value of the offset 32 is positive.

Continuing to refer to FIG. 3a, the output 34 of the first adder 30 is connected to an input 48 of a second adder 35, an input of a multiplexer (b) 42, and an input (a') 43 of a comparator 38. The second adder 35 has as its second input the buffer length (L) 36. The second adder produces an output 37 which has the value of A+M when the value of the offset (M) 32 is negative and the value A+M+L when the value of the offset (M) 32 is positive. The output 37 of the second adder 35 is connected to an input (a) 41 of the multiplexer 39.

Continuing to refer to FIG. 3a, the base address (B) 45 is connected to an input (b') 44 of the comparator 38. The comparator 38 determines if the output 34 of the first adder 30 is less than the base address (B) 45. When the value of the offset (M) 32 is negative the comparison is A+M<B, and when the value is positive the comparison is A+M−L<B. The output of the comparator (Cond.) 46 is connected to the multiplexer 39 and selects which input 41 42 to the multiplexer is connected to the output A(new) 40.

Referring to FIG. 3b, a table shows the controlling factors in the address generator circuit of FIG. 3a The column headed "M" shows the polarity of the offset 32 and the column headed MSB shows the value of the most significant bit of the offset 32. The column headed (a'<b') shows the comparison value of the inputs to the comparator 38 where a one represents (a') less than (b') and a zero represents (a') not less than (b'). The column headed (Cond.) shows the output of the comparator, and the column headed A(new) shows the new address generated by the circuit of FIG. 3a showing the new address and from which input to the multiplexer the address was taken.

Continuing to refer to FIG. 3b, when the polarity of the offset (M) 32 is negative, the MSB of the offset is one and if the comparator input is (a'<b'), then Cond.=0 and A(new)= a=A+M+L where "a" is an input to the multiplexer 41. When the offset continues to be negative and the comparator input is not (a'<b'), then Cond.=1 and A(new)=b=A+M where "b" is an input to the multiplexer 42. When the polarity of the offset is positive, the value of MSB is zero. If the comparator input is (a'<b'), Cond.=0 and A(new)=a=A+M. When the polarity of the offset remains positive and the comparator input is not (a'<b'), Cond.=1 and A(new)=b=A+M−L.

Figure 4:
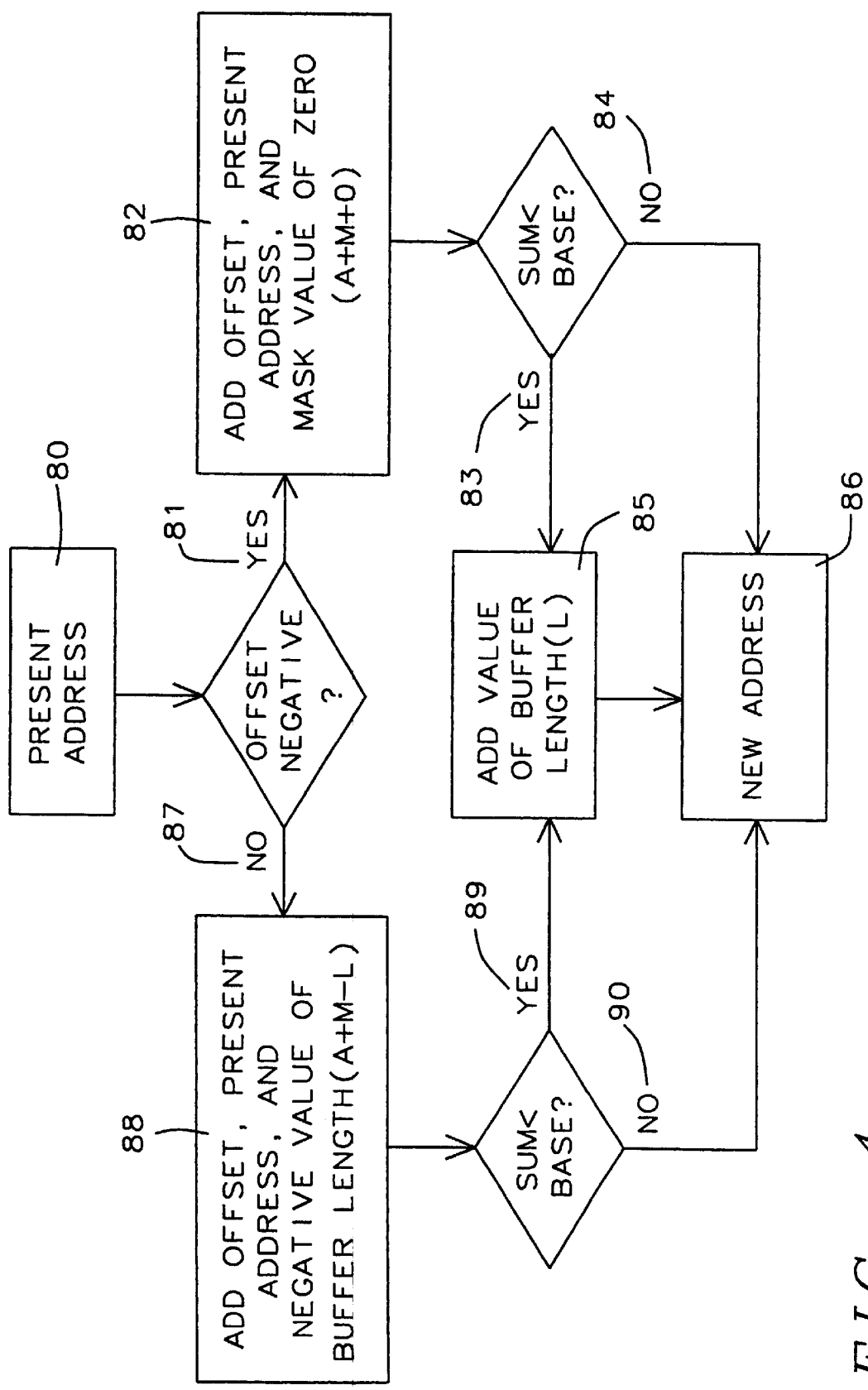
FIG. 4 shows the process for determining the next address for a circular buffer for both a positive and negative offset.

Referring to FIG. 4, a flow diagram of a method to generate addresses for a circular buffer is shown. Starting with the present address, if the offset is positive 87, then the present address, the offset and the negative value of the buffer length are added together (A+M−L) 88. If the sum is less than the base (A+M−L<B) 89, then the positive value of the buffer length 85 is added to the sum (A+M−L+L=A+M) 88 and the new address 86 is the sum of the present address and the offset (A+M). If the sum is greater than the base address (A+M−L>B) 90, then the new address 86 is sum of the present address, the offset and the negative value of the buffer length (A+M−L).

Continuing to refer to FIG. 4, starting with the present address 80, if the offset is a negative value 81, then the present value, the offset and zero value mask are added together (A+M+0) 82 (the zero value mask replacing the negative value of the buffer length in the summation). If the sum is less than the base (A+M+0<B) 83, then the buffer length is added to the sum (A+M+0+L=A+M+L) 85 and the new address 86 becomes the sum of the present address, offset, zero value mask and the buffer length (A+M+L). If the sum is greater than the base address (A+M+0>B) 84, then the new address 86 becomes the sum of the present address and the offset (A+M).

While the invention has been particularly shown and described with reference to preferred embodiments thereof, it will be understood by those skilled in the art that various changes in form and details may be made without departing from the spirit and scope of the invention.

What is claimed is:

1. An apparatus for addressing a circular buffer, comprising:
    a) a three input adder and a two input adder to generate a next address of a circular buffer,
    b) an input for a base address and an input for a buffer length to provide a range of valid buffer addresses,
    c) an input for a present address and an input for an offset from the present address to determine said next address,
    d) said three input adder adding said present address to said offset and selectively adding a negative value of said buffer length when said offset is positive,
    e) two input adder adding said buffer length to output of said three input adder,
    f) said next address selected by a multiplexer to be an output of said two input adder when said base address is greater than an output of said three input adder and to be the output of said three input adder when said base address is less than output of said three input adder.

2. The apparatus of claim 1, wherein the offset is a positive value, making the value of the next address be above an upper bound of the circular buffer, and requiring a negative value of the buffer length to be added to the next address to bring said next address within the bounds of the circular buffer.

3. The apparatus of claim 1, wherein the offset is a negative value, making the value of the next address be below a lower bound of the circular buffer, and requiring a positive value of the buffer length to be added to the next address to bring said next address within the bounds of the circular buffer.

4. The apparatus of claim 1, wherein the MSS (most significant bit) of the offset is used as a means for connecting a negative value of the buffer length to an input of the three input adder.

5. A circuit for address generation for a circular buffer, comprising:
    a) a first adder having a first input for adding a present buffer address, a second input for adding an address offset, and a third input for adding a negative value of a buffer length,
    b) said first adder having means to mask the third input to provide a two input adder capability to add the present buffer address to the offset,
    c) said mask of the third input of the first adder controlled by an MSB (most significant bit) of the offset,
    d) a second adder having two inputs for adding an output of the first adder to the buffer length,
    e) a multiplexer circuit for choosing one of two inputs as a new circular buffer address,
    f) a first input of said multiplexer circuit connected to an output of said second adder,
    g) a second input of said multiplexer circuit connected to the output of said first adder,
    h) an output of a comparator circuit used to select which input to the multiplexer circuit to output as the new circular buffer address,
    i) said comparator circuit comparing the output of the first adder to a base address of the circular buffer.

6. The circuit of claim 5, wherein the buffer length is connected to the third input of the first adder by means of an exclusive NOR with the MSB of the offset and producing a negative value of the buffer length at the third input of the first adder when the offset is positive.

7. The circuit of claim 6, wherein the third input of the first adder is masked to a zero value by means of an AND circuit controlled by the MSB of the offset when the offset is negative.

8. The circuit of claim 5, wherein the multiplexer circuit is controlled to select one of two inputs as a new buffer address based on whether said offset from the present address will take the new address beyond the range of the circular buffer requiring a correction by an amount equal to the buffer length.

9. The circuit of claim 5, wherein the comparator compares the output of the first adder to the base address of the circular buffer and controls the multiplexer to select the output of the second adder when the base address is greater than the output of the first adder, and controls the multiplexer to select the output of the first adder when the base address is less than the output of the first adder.

* * * * *